(12) United States Patent
Hills

(10) Patent No.: X2412
(45) Date of Patent: Dec. 27, 1815

(54) BALANCE, STEELYARDS

(76) Inventor: Samuel Hills

Samuel Mills
Letters Patent.

The Schedule referred to in these Letters Patent and making part of the same containing a description in the words of the said Samuel Mills himself of his improvement upon the Steel Yards.

The general appearance both of the beam and poise is similar to those in common use, but their peculiarity [illegible] is that the notches [illegible]. The main axle or pivot which is nearest the notches, and as the beam are placed in a right line with it, and the other axles so placed that one edge of the main axles, and one edge of another axle are in a right line with the bottom of the notches in the corresponding edge of the beam, and the other side is also constructed upon the same principle which brings both sides to the principle of the Balance, and the second and third axles are placed as usual, but the first or main axle is so longer to let its [illegible] play on the next axle, and the beam being correctly graduated cannot fail of giving the true weight Witnesses:
Stanford Mills
Josiah Whitely Samuel Mills Exd.
[illegible]

Drawing not Required —